United States Patent [19]

Hattori et al.

[11] Patent Number: 4,937,408

[45] Date of Patent: Jun. 26, 1990

[54] SELF-ILLUMINATING PANEL SWITCH

[75] Inventors: Yoshihiro Hattori; Takashi Murakami; Yoshihiro Tsujita, Amagasaki, all of Japan

[73] Assignee: Mitsubishi Denki Kabushiki Kaisha, Tokyo, Japan

[21] Appl. No.: 356,215

[22] Filed: May 24, 1989

[30] Foreign Application Priority Data

May 30, 1988 [JP]  Japan .................................. 63-72154

[51] Int. Cl.$^5$ ............................................. H01H 13/02
[52] U.S. Cl. .................................................... 200/314
[58] Field of Search ............... 200/314, 311, 313, 315, 200/517

[56] References Cited

U.S. PATENT DOCUMENTS

| | | |
|---|---|---|
| 2,953,668 | 9/1960 | Bassett, Jr. ........................... 200/313 |
| 3,377,453 | 4/1968 | Duris ..................................... 200/314 |
| 4,022,993 | 5/1977 | Shattuck ......................... 200/313 X |
| 4,262,182 | 4/1981 | Basler et al. ......................... 200/314 |

FOREIGN PATENT DOCUMENTS 60-7330  2/1985  Japan .
62-30747 8/1987  Japan .

Primary Examiner—Renee S. Luebke

[57] ABSTRACT

In a self-illuminating panel switch, a key top is supported by a front panel. The key top has a rear surface on which a character area is printed with one of a dark color or a light color, and the background area is printed with the other of a dark color and a light color. Because the printing is made on the rear or inner surface of the key top, the ink is free from wear or removal.

8 Claims, 2 Drawing Sheets

SELF-ILLUMINATING PANEL SWITCH

BACKGROUND OF THE INVENTION

The present invention relates to an improvement in a panel key switch, particularly suitable for use in a keyboard on a telephone set.

FIG. 1A and FIG. 1B show conventional panel key switches. FIG. 2A and FIG. 2B show an arrangement of panel key switches in a keyboard. As illustrated, key tops 1 are provided on a front panel 2, which holds the key tops 1 and regulates the movement of the key tops 1 so that the key tops 1 can be manipulated properly. Rubber contacts 3 and corresponding parts of a printed circuit board 4 form switch circuits for the respective key tops 1. Each of the switch circuits is closed when the corresponding key top 1 is pressed. Light-emitting diodes 4a are mounted on a printed circuit board 4 to illuminate the key tops 1 from the rear or the inside of the front panel.

Characters are printed on the surface 1g of each key top 1. The printed characters are observed under sun light or other illumination. To enable observation of the characters in the dark, light-emitting diodes 4a are turned on to illuminate the rear surface of the key tops 1 so that the character areas 1b look dark and the background area 1d look light (or bright). To this end, the key top 1 must be made of a translucent material. If the key top 1 is made of a completely transparent material, the brightness is not uniform throughout the surface 1g of the key top 1, so it is difficult to see the characters.

Because the prior-art self-illuminating panel switch is formed as described above, the printed characters are contacted by a finger or the like. It is therefore necessary that the ink forming the printed characters is firmly attached to the surface of the key top, or is protected by a coating formed over it, or by a special configuration of the surface of the panel. Moreover, the surface 1g of the key top 1 must be flat to facilitate the printing. These impose limitations on the fabrication process and the design.

The above-described problem is also present when characters are printed with white or light color on a dark background.

SUMMARY OF THE INVENTION

An object of the invention is to eliminate the above problems.

Another object of the invention is to provide a self-illuminating panel switch of which the printing on the surface of the key top can be easily made, and restrictions on the design are reduced.

In a self-illuminating panel switch according to the invention, the dark area is printed with a dark color on the rear of inner surface of a transparent or translucent key top, and the remaining area is printed with a light color on the rear surface of the transparent key top.

During the daytime or under environmental illumination, the characters are clearly visible because of the transparency of the key top and the contrast between the dark area and the light area. In the dark, being illuminated from the light-emitting diodes or some other illumination provided at the back of the key top, the characters are clearly visible by light transmitting from the rear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE EMBODIMENTS

Figure 1A:
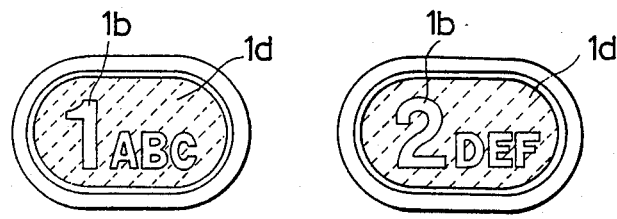
FIG. 1A and FIG. 1B are a plan view and a sectional view showing prior-art panel switches.
Figure 1B:
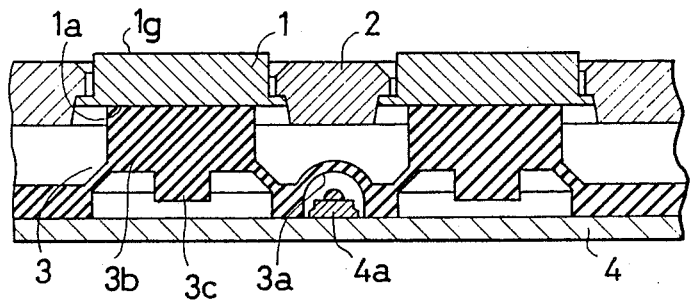
Figure 2A:
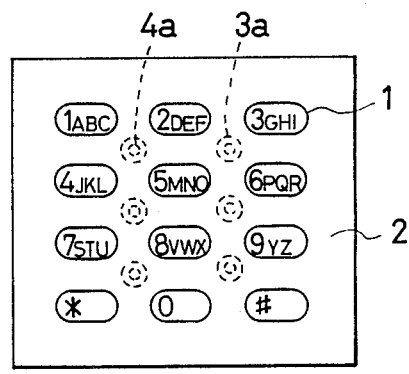
FIG. 2A and FIG. 2B are a plan view and an elevational view showing a keyboard including the panel switches.
Figure 2B:
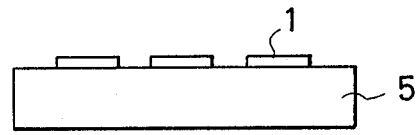
Figure 3A:
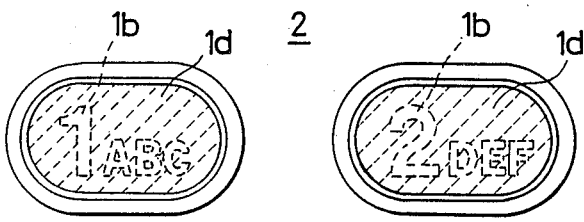
FIG. 3A and FIG. 3B are a plan view and a sectional view showing panel switches of an embodiment of the present invention.
Figure 3B:
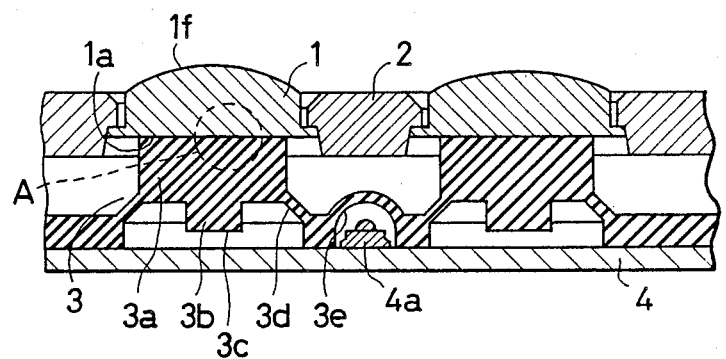
Figure 4:
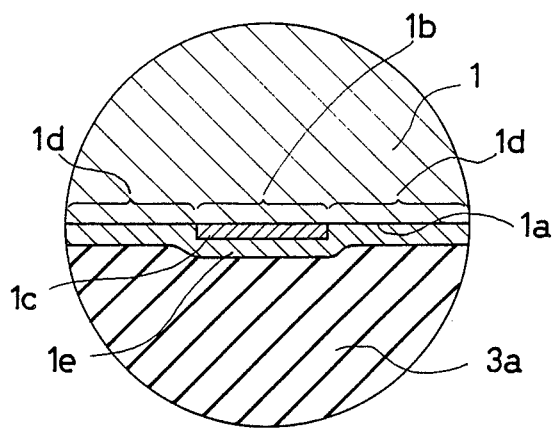
FIG. 4 is an enlarged sectional view of part A in FIG. 3B.

An embodiment of the invention will now be described with reference to FIG. 3A and FIG. 3B. The panel switches according to the present invention are typically provided in a keyboard such as the one shown in FIG. 2, and used in a telephone set. As illustrated, the keyboard including panel switches of this embodiment comprises key tops 1, a front panel 2 for supporting a plurality of the key tops 1 and regulating them in such a manner that they can be correctly operated. The keyboard further comprises upright portions 3a for supporting respective key tops 1 from the rear, and projections 3b extending rearward (downward as seen in FIG. 3B) with a contact electrode (not shown as such) formed on the rear end 3c, skirt-shaped portions 3d capable of being resiliently bent responsive to a pressing force on the key top 1 to allow the contact electrode to contact interdigitating comb patterns (not shown) on a printed circuit board 4, and dome portions 3e each covering a light-emitting diode 4a mounted on the printed circuit board 4.

The upright portions 3a, the projections 3b, the skirt-shaped portions 3c, and the dome portions 3e are all formed of a transparent rubber continuous to each other, i.e., integral with each other. The contact electrode on the rear end 3c of each projection 3b and the switch pattern on the printed circuit board 4 form a switch circuit which is closed when the corresponding key top 1 is pressed and the projection 3b is lowered by resilient deformation of the skirt-shaped portion 3d. When the pressing force is removed, the skirt-shaped portion 3b is restored to its original shape and the key top 1 is pushed forward to its original position.

The key top 1 is formed of a material which is not colored and which permits transmission of light. Preferably, the key top 1 is formed of a material which is completely transparent to light.

Characters (or letters), for example, "1ABC" are printed on the rear surface 1a of the key top 1 with black ink 1c, so that the area 1b within the characters are opaque. A further printing is made with white ink 1e on the entire rear surface 1a so that the area (background area) 1d other than the character area 1b is translucent. The top surface 1f of the key top 1 can be curved like a convex lens as may be desired.

Under sun light or other environmental illumination, the characters 1c of the key top can be seen easily because of the transparency of the material of the key top 1. In the dark, the light-emitting diodes 4a are turned on, so they illuminate through the dome portions 3e and the upright portions 3a, the white ink layer 1e. The light reaching the white ink layer 1e is partly transmitted and directed forward. As a result, the background area 1d looks light (or bright). On the other hand, no light is transmitted through the character area 1b where the black ink 1c is applied. This gives contrast in the brightness between the background area 1d and the character area 1b which is dark. Thus, the characters are observed as a silhouette.

The light reflected at the white ink layer 1e can be again reflected somewhere in the space between the front panel 2 and the printed circuit board 4 and again redirected to the white ink layer 1e. If this reflected light arrives in the background area 1d, part of this light is again transmitted forward thereby to increase the brightness of the background area 1d. Such reflection occurs also at the white ink layer 1e provided at the back of (i.e., covering) the black ink layer 1c with the result that the brightness of the background area is increased. This means the light from the light-emitting diodes is utilized efficiently and hence the power consumption for energizing the light-emitting diodes 4a is reduced.

The white ink layer 1a should preferably have a light-diffusing characteristics, so that the incident light is diffused and the brightness is made uniform throughout the entire background area 1d. This facilitates observation of the characters on the key top 1.

Because the surface 1f of the key top 1 is convex-shaped, the characters 1c can be seen enlarged or as if they are nearer. This improves the visibility.

Because the ink layers are formed on the rear or inner surface of the key top, they are not touched by a finger or the like, so it is free from damage or wear, or peeling.

In the above embodiment, the characters 1c are black and the background area 1d is white. But it is also possible to use some other dark color for the characters 1b and some light color for the background area 1d. Moreover, it is possible to apply black or some dark color for the background area and apply white or some light color for the entire surface so that the area of the characters permit transmission of the diffused light while the background area 1e is seen as being dark when light-emitting diodes are turned on in the dark.

In the embodiments described, it is assumed that the characters are printed on a key top to indicate the functions of the switch. The invention is applicable where marks other than characters are printed. In any case, the printing comprises a dark area formed of a dark-color ink layer and a light area formed of a light-color ink layer.

In the appended claims, the term "dark color" should be construed to include black, and the term "light color" should be construed to including "white".

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A self-illuminating panel switch comprising:
   a key top formed of one of transparent and translucent material, said key top having a front surface and a rear surface, said rear surface having a character in a dark color printed thereon, said rear surface further being covered by a light color ink layer which also covers a rear side of said character, an entire rear surface of the key top being transparent or translucent except for an area covered by said character;
   front panel means for supporting the key top whereby said key top can be pressed rearwardly from an original position;
   key top support means for supporting the rear surface of the key top whereby after said key is pressed rearwardly, the key top can return to the original position; and
   means for illuminating the rear surface of the key top, light from the means for illuminating being at least partially transmitting through the ink layer and the key top except at the area covered by said character.

2. The switch according to claim 1, wherein the key top is formed of a transparent material.

3. The switch according to claim 1, wherein said rear surface of said key top is generally flat.

4. The switch according to claim 1, wherein the front surface of the key top is convex.

5. The switch according to claim 1, wherein said illuminating means comprises a light-emitting diode mounted on a printed circuit board.

6. The self-illuminating panel switch according to claim 1, wherein the ink layer has light-diffusing characteristics whereby incident light from the means for illuminating is diffused and brightness of the key top is uniform throughout except for the area covered by said character.

7. The self-illuminating panel switch according to claim 1, wherein the light color of the ink is white and the dark color of the character is black.

8. The self-illuminating panel switch according to claim 1, wherein the character indicates a function of the panel switch.

* * * * *